INVENTOR.
John C. Petropoulos
John K. Gillham

United States Patent Office 3,382,221
Patented May 7, 1968

3,382,221
THERMOSET RESINS CONTAINING THE
s-TRIAZINE RING
John Christos Petropoulos, Norwalk, and John Kinsey
Gillham, Stamford, Conn., assignors to Formica Corporation, Cincinnati, Ohio, a corporation of Delaware
Continuation-in-part of application Ser. No. 183,261,
Mar. 28, 1962, which is a continuation-in-part of
application Ser. No. 103,967, Apr. 19, 1961. This
application June 17, 1964, Ser. No. 376,310
18 Claims. (Cl. 260—88.3)

ABSTRACT OF THE DISCLOSURE

This invention relates to a novel process for the polymerization of a group of compounds having the formula (I)

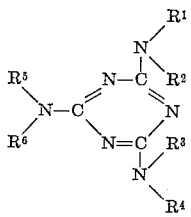

Figure 1:
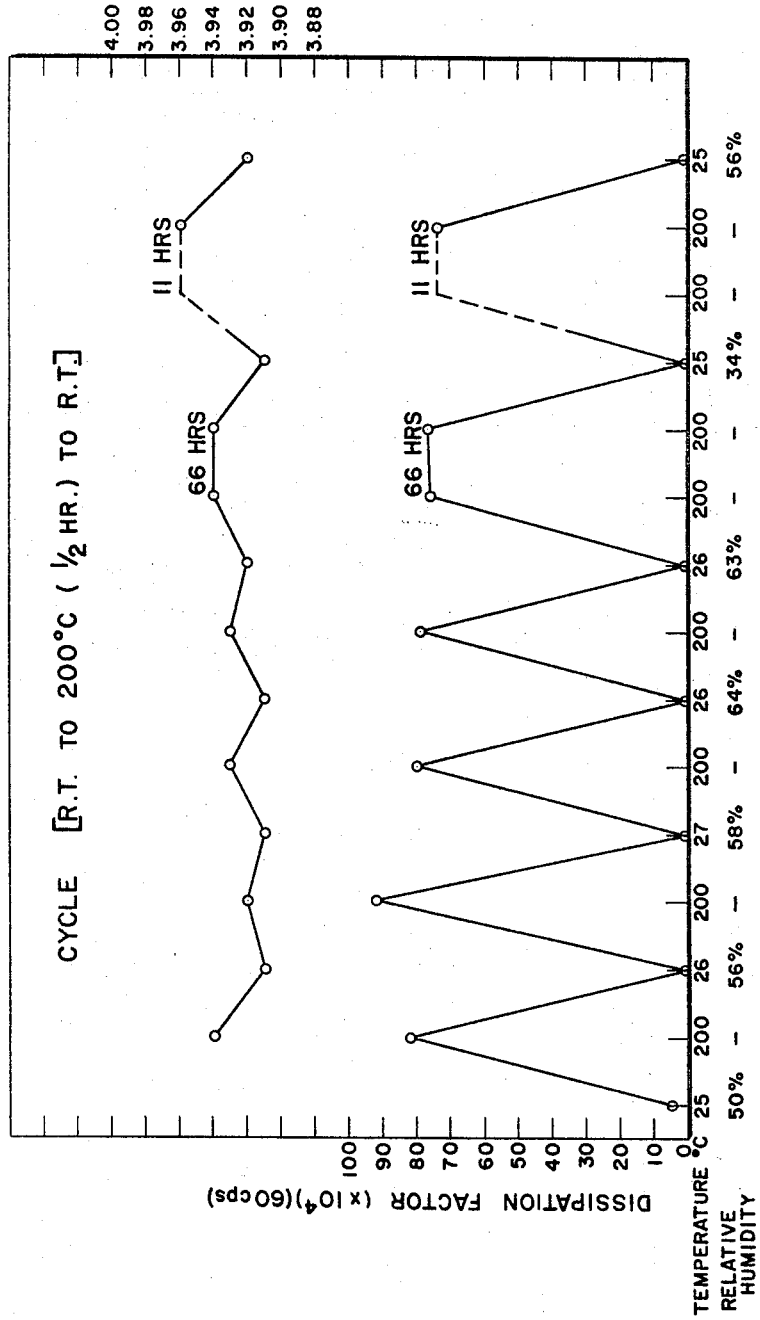
Figure 2:
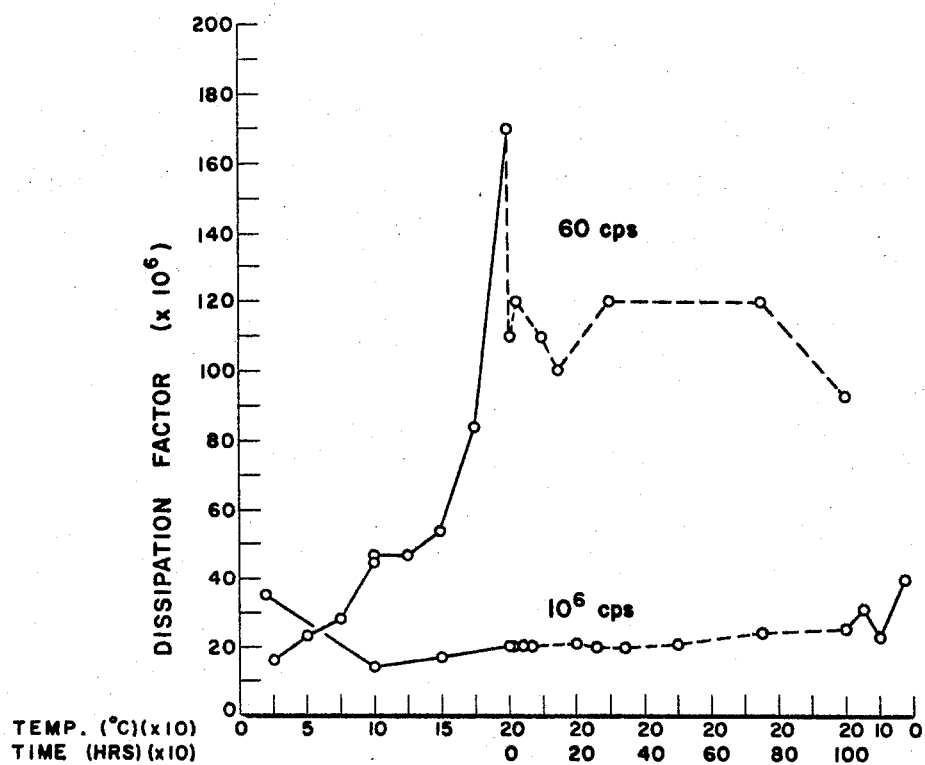

wherein $R^1$, $R^2$, $R^3$, $R^4$, $R^5$ and $R^6$ individually represent an alkyl radical having from 1 to 10 carbon atoms, inclusive, an aryl radical having from 6 to 10 carbon atoms, inclusive, an alkene radical having from 2 to 4 carbon atoms, inclusive, an aralkyl radical, an alkaryl radical or a cycloalkyl radical, not more than one of the pairs of radicals $R^1$ and $R^2$, $R^3$ and $R^4$, and $R^5$ and $R^6$, together with the non-ring nitrogen atom, represent a 6 to 9 membered alkylenimino radical and wherein at least four of the $R^1$ to $R^6$ groups are allyl radicals, comprising heating said compound to a temperature of between 70° C. and 350° C. in the presence of a catalyst having the formula (II)

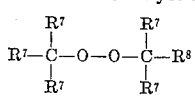

wherein each $R^7$ is the same or a different alkyl radical having 1 to 4 carbon atoms, inclusive, and $R^8$ is an alkyl radical having 1 to 4 carbon atoms, inclusive, an

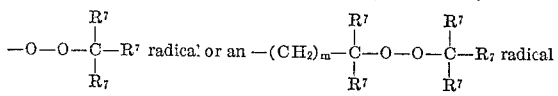

wherein $m$ is a whole positive integer of from 1 to 4, inclusive, and $R^7$ is as defined above for general Formula II.

---

This application is a continuation-in-part of application Ser. No. 183,216, filed Mar. 28, 1962, now abandoned, which, in turn, is a continuation-in-part of application, Ser. No. 103,967, filed Apr. 19, 1961, now abandoned.

It is an object of the present invention to produce polymers of melamine derivatives having all the hydrogen atoms of the non-ring nitrogen atoms replaced by saturated or unsaturated alkyl, aryl, alkaryl, aralkyl, cycloalkyl or alkylenimino radicals, wherein at least four of the hydrogen atoms have been replaced by allyl groups.

It is a further object of this invention to present a novel process for the polymerization of said melamine derivatives which comprises heating said derivative to a temperature of from about 70° C. to about 350° C. in the presence of a catalyst represented by Formula II, above.

It is still a further object of the present invention to prepare heat resistant, thermoset, polymeric resins from melamine derivatives represented by Formula I, above, which resins unexpectedly display excellent electrical properties, such as surprisingly low dissipation (loss) factors and high arc resistances and additionally, maintain their mechanical properties when subjected to high temperatures for extended periods of time. Quite surprisingly, the polymers formed from monomers containing four or more allyl groups are more stable in nitrogen and in air at elevated temperatures than those produced from other allyl containing melamine monomers, even those containing three allyl groups. This phenomena is demonstrated by the examples set forth hereinbelow.

Other features and objects of the present invention will be apparent to one skilled in the art upon reading the more detailed description presented hereinbelow.

We have found that we are unexpectedly able to produce hard, solid, thermoset polymers from the compounds represented by Formula I, above, by conducting the polymerization thereof in the presence of a selected group of catalysts and under an essentially oxygen-free atmosphere. Quite unexpectedly, these catalysts were the only ones found to initiate the polymerization of these compounds to solid polymers possessing a multiplicity of unique and highly advantageous properties. Other well-known vinyl polymerization initiators were found to be entirely unsatisfactory for use in our novel process and other known methods of polymerization, such as X-ray and ultraviolet radiation, were also found ineffective.

The temperature of polymerization of the polymerizable monomers can be varied over a somewhat wide range. In most cases, the polymerization temperature depends upon the catalyst used, the rapidity of polymerization desired and other influencing factors.

Generally, however, our novel process is carried out at temperatures ranging from about 70° C. to about 350° C., preferably from about 90° C. to about 220° C., at low pressures, i.e., preferably, about 2 mm. Hg to about atmospheric. Higher or lower pressures, however, may be used without detracting from the efficacy of our process. It is convenient also to employ a temperature during the reaction at which the half-life of the catalyst employed is about 10 hours. By "half-life" is meant that a catalyst is selected which, at the temperature of the reaction, will decompose to one-half its amount in about 10 hours.

The time of contact of the monomer with the catalyst is generally within the range of about 10 minutes to about 72 hours, depending upon the catalyst used and the degree of conversion desired. The latter length of time generally insures that a substantially complete reaction will be effected. The conversion of the liquid monomer may be arrested at any stage of the polymerization so as to obtain varying states of matter such as very viscous liquids, gels, rubbery materials etc. which may later be further treated to produce a solid article of the resin in its thermoset state. The conversion may be arrested by quenching and therefore no further catalyst need be added during the subsequent treatment to form the thermoset product.

The polymerization, as mentioned above, is preferably carried out in the presence of an inert gas or in vacuum. The main consideration is that essentially no oxygen be present during the reaction, however, trace amounts are tolerable. Inert gases which may be employed include any of those well known in the art such as, nitrogen, argon, neon and the like. Alternatively, a solvent system may be employed during which no inert gas need be used, since the solvent prevents the reactions media from coming in contact with any oxygen which may be present in the reaction vessel. However, a blanket or inert gas generally should also be employed during a solvent polymerization process.

The catalyst used in our novel process, in amounts ranging from about 0.1% to about 10.0%, preferably about 0.5% to 3.0%, based on the amount of monomer employed, are represented by Formula II, set forth hereinabove, and include such compounds as di-tertiary butyl peroxide, 2-t-butylperoxy-2-methyl n-butane, 3-t-butylperoxy-3-methyl n-pentane, 3-t-butylperoxy-3-ethyl n-pentane, di[2-methyl n-butyl]-2-peroxide, di[2-ethyl n-butyl]-2-peroxide, di[3-methyl n-pentyl]-3-peroxide, di]3-ethyl n-pentyl]-3-peroxide, 2-methyl-2-t-butylperoxy n-hexane, 2-butyl-2-t-butylperoxy n-hexane, di[2-methyl n-hexyl]-2-peroxide and the like. Also we may employ 2,2-bis(tertiarybutylperoxy) n-butane, 2-[2'-(2'-methyl butyl)peroxy]-2-t-butylperoxy n-butane, 2,2-bis[2'-(2'-methylbutyl)peroxy] n-butane, 2,2 - bis[3'-(3'-methylheptyl)peroxy]butane, 2,2 - bis[3' - (3'-methylpentyl)-peroxy] n-butane, 3,3-bis[2'-(2'-methylbutyl)peroxy] n-pentane, 5,5-bis[5'-(5'-propylnonyl)peroxy]nonane, 2,5-dimethyl-2,5-di(tertiarybutylperoxy) n-hexane, 2,6-di-t-butyl-2,6-di(t-butylperoxy) n-heptane, 2,6-dimethyl-2,6-di(t-butylperoxy) n-heptane, 3,5-dimethyl-3,5-[2'-(2'-methylbutyl)peroxy] n-heptane and the like.

Compounds which are represented by Formula I, above, and are therefore useful in our novel process, include hexallyl melamine,
2,4-bis(diallylamino)-6-piperidino-s-triazine
2,4-bis(diallylamine)-6-diamylamino-s-triazine,
2,4-bis(diallylamino)-6-dibenzylamino-s-triazine,
2,4-bis(diallylamino)-6-ditolylamino-s-triazine,
2,4-bis(diallylamino)-6-dixylylamino-s-triazine,
2,4-bis(diallylamino)-6-divinylamino-s-triazine,
2,4-bis(diallylamino)-6-methylpentylamino-s-triazine,
2,4-bis(diallyamino)-6-octylphenylamino-s-triazine,
2,4-bis(diallylamino)-6-di-n-butylamino-s-triazine,
2,4-bis(diallylamino)-6-benzylmethylamino-s-triazine,
2,4-bis(diallylamino)-6-dicyclohexylamino-s-triazine,
2-diallyamino-4,6-bis(allylmethylamino)-s-triazine,
2,4-bis(diallylamino-6-allylmethylamino-s-triazine,
2,4-bis(diallylamino)-6-allyldecylamino-s-triazine,
2,4-bis(diallylamino)-6-allylphenylamino-s-triazine,
2,4-bis(diallylamino)-6-allylvinylamino-s-triazine,
2,4-bis(diallylamino)-6-dimethylamino-s-triazine,
2,4-bis(diallylamino)-6-dioctylamino-s-triazine,
2,4-bis(diallylamino)-6-diphenylamino-s-triazne, and the like.

The thermoset polymers of the compounds of Formula I, as mentioned above, may include homopolymers of these compounds or copolymers thereof with various monomers copolymerizable therewith. Our invention is directed to homopolymers and copolymers produced from said compounds and various articles produced therefrom, such as laminates, moldings, castings, films, overlays in decorative laminates, and the like.

Our invention is based on the discovery that the polymeric materials produced from the compounds of Formula I have particular and advantageous properties which make them especially valuable for use in industry. Additionally, they can be readily and comparatively economically prepared, as briefly described hereinabove, and more fully set forth in the following paragraphs.

The compounds embraced by Formula I are each prepared in a similar manner although the amount of reactants in each instance must be varied so as to produce the desired product.

The compounds of Formula I of the present invention may, preferably, be produced by reacting cyanuric chloride and various secondary amines, in a total molar ratio of about 1 to about 3.3, respectively, and in the presence of an inert solvent for the cyanuric chloride and an acid acceptor consisting of excess amine, other organic bases or various inorganic bases. The reactants are heated to a temperature of from about 0° C. to 200° C. with the reaction being preferably carried out in from one to three stages. Various other known methods may also be used, such as for example, those disclosed in U.S. Patent No. 2,566,226, and articles by Pearlman et al., "Journal of the American Chemical Society," volume 70, pp. 3726–3728, 1948 and Smolin et al., "s-Triazines and Derivatives" Interscience Publishers Inc., New York, pp. 351–352, 1959, without distracting from the unique properties disclosed above. These methods, however, form no part of the present invention.

The compounds of Formula I of the present invention, when homopolymerized or copolymerized by our novel process, form thermoset polymers which, when subjected to high temperatures maintain their mechanical properties and unexpectedly possess excellent electrical properties, i.e., low dissipation factors and a high arc resistance. This combination of mechanical and electrical properties is unique among plastics and is not shown by any commercially available resin. These polymers are used in reinforced, thermoset resins for application in industrial laminates and molding compounds. The laminates have exceptional thermal stability and find wide usage in such articles as printed circuits and the polymer itself finds use in other electrical applications wherein change of frequency is involved, such as transformers and the like.

Our novel polymers possess a unique combination of electrical and mechanical properties enabling the use thereof in fields heretofore not served by commercially available materials. It is known that such materials as paraffin waxes, phenolic resins, epoxy resins, and generally organic resins per se, although possessing some desired characteristics, do not posses the unusual combination of low dissipation factor, high arc resistance, excellent thermal stability and thermal softening behavior shown by the polymers of our invention. That is to say, our polymers possess the ability to retain a maximum percentage of their room temperature mechanical strength at high temperatures while exhibiting the character of minimum softening while heating them to said temperature. In regard to their electrical properties, the unusual combination of high arc resistance and low dissipation factor shown by our polymers is superior to all commercially available resins at room temperature, save the silicones. However, the silicones possess inferior mechanical strength and display inferior thermal softening behavior. Furthermore, the polymers of our invention are far superior to the silicones in respect to adhesion and resistance to organic solvents. Therefore, our polymers are more attractive in regard to the use of materials which require excellent dielectric properties and arc resistance in combination with superior mechanical properties.

The unexpected superior electrical properties of our polymers are believed to be attributable to at least three factors, (a) lack of polar groups, (b) freedom from —NH groups and (c) resonance stabilization of the s-triazine nuclei with their three exterior nitrogen atoms. Polar groups produce charge separation at the molecular level which adversely affect dielectric properties. The —NH groups can polarize the structure by the process of hydrogen-bonding. This polarizing process occurs for example, in commercially available melamine-formaldehyde resins which contain undesirable polar groups. The s-triazine ring with its three outer nitrogen atoms exists at the molecular level in a resonance form which implies lack of charge separation. Our polymers therefore are similar in their dielectric properties at room temperature to the hydrocarbon polymers, e.g., paraffin wax, polystyrene etc. However, these latter materials do not retain their mechanical properties at higher temperatures and are therefore limited in their use to low temperatures. Evidence of further similarity of the monomers used to produce our novel polymers is their common solubility in hydrocarbon solvents, i.e., hexane.

The stability of monomeric substituted amino triazines increases in the order

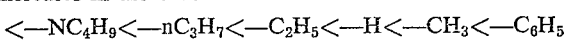

as disclosed more specifically in an article by Sheehan et al., Journal of Applied Polymer Science, volume 6, Issue Number 19, pp. 47–56, 1962. It is believed that the relatively high degree of instability associated with the higher alkyl substituted amino triazine monomers is due to interaction and/or increased collision frequency of an alkyl hydrogen with a ring nitrogen atom, e.g.

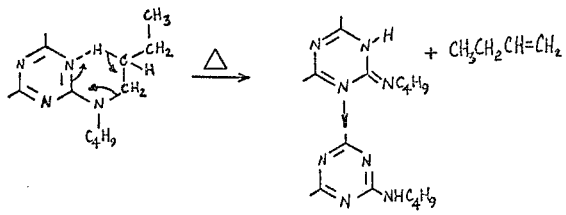

Credence is lent to this mechanism by the excellent stability of the piperidino derivative in which the cyclic alkyl groups are rigidly held in a position directed away from the triazine nucleus. Monomeric tris-piperidino-s-triazine has the same order of stability as the methyl derivative in the Sheehan et al. article, discussed above.

The thermal stability of the poly(N,N-diallylamino-s-triazine) derivatives of our invention is attributed to the formation during polymerization of piperidino-type rings which result from an "intra" mechanism or cyclization between two of the allyl groups attached to the same non-ring nitrogen atom.

Thus, if R· be an attacking radical, then

The cyclization is then followed by intermolecular polymerization by the attack of the new radical on another diallylamino group.

Examples of monomers which may be copolymerized with the monomers represented by Formula I, above, and which can be polymerized either singly or in a plurality (two, three, four or any desired number), the latter often being desirable in order to improve the compatibility and copolymerization characteristics of the mixture of monomers and to obtain new and valuable copolymers having the particular properties desired for the particular service application, are such monomers as the unsaturated alcohol esters, more particularly the allyl, methallyl, crotyl, 1-chloroallyl, 2-chloroallyl, cinnamyl, vinyl, methvinyl, 1-phenylallyl, butenyl, etc., esters of saturated and unsaturated aliphatic and aromatic, monobasic and polybasic acids, such, for instance, as acetic, propionic, butyric, valeric, caproic, acrylic and alpha-substituted acrylic (including alkacrylic, e.g., methacrylic, ethacrylic, propacrylic, etc., and arylacrylic, e.g., phenylacrylic, etc.), crotonic, oxalic, malonic, succinic, glutaric, adipic, pimelic, suberic, azelaic, sebacic, maleic, fumaric, citraconic, mesaconic, itaconic, acetylene dicarboxylic, aconitic, benzoic, phenylacetic, phthalic, terephthalic, benzoylphthalic, etc., acids; the saturated monohydric alcohol esters, e.g., the methyl, ethyl, propyl, isopropyl, butyl, sec.-butyl, amyl, etc.; esters of ethylenically unsaturated aliphatic monobasic and polybasic acids, illustrative examples of which appear above; vinyl cyclic compounds (including monovinyl aromatic hydrocarbons), e.g., styrene, o-, m-, and p-chlorostyrenes, -bromostyrenes, -fluorostyrenes, -methylstyrenes, -ethylstyrenes, -cyanostyrenes, the various poly-substituted styrenes such, for example, the various di-, tri-, and tetra-chlorostyrenes, -bromostyrenes, -fluorostyrenes, -methylstyrenes, -ethylstyrenes, -cyanostyrenes, etc., vinyl naphthalene, vinylcyclohexane, vinyl furane, vinyl pyridine, vinyldibenzofuran, divinyl benzene, trivinyl benzene, allyl benzene, diallyl benzene, N-vinyl carbazole, the various allyl cyanostyrenes, the various alpha-substituted styrenes and alpha-substituted ring-substituted styrenes, e.g., alpha-methyl styrene, alpha-methyl-para-methyl styrene, etc.; unsaturated ethers, e.g., ethyl vinyl ether, diallyl ether, ethyl methallyl ether, etc.; unsaturated amides, for instance, N-allyl caprolactam, acrylamide, and N-substituted acrylmides, e.g., N-methylol acrylamide, N-alyl acrylamide, N-methyl acrylamide, N-phenyl acrylamide, etc.; unsaturated ketones, e.g., methyl vinyl ketone, methyl allyl ketone, etc.; methylene malonic esters, e.g., methylene methyl malonate, etc.; ethylene; butadienes, e.g., 1,3-butadiene, 2-chlorobutadiene, etc.; unsaturated polyhydric alcohol (e.g., butenediol, etc.) esters of saturated and unsaturated, aliphatic and aromatic monobasic and polybasic acids.

Other examples of monomers that may be copolymerized with the monomers of Formula I are the vinyl halides, more particularly vinyl fluoride, vinyl chloride, vinyl bromide, and vinyl iodide, and the various vinylidene compounds, including the vinylidene halides, e.g., vinylidene chloride, vinylidene bromide, vinylidene fluoride and vinylidene iodide, other comonomers being added if needed in order to improve the compatibility and copolymerization characteristics of the mixed monomers.

More specific examples of allyl compounds that may be copolymerized with the allyl compounds of Formula I are allyl alcohol, methallyl alcohol, diallyl carbonate, allyl lactate, allyl alpha-hydroxyisobutyrate, allyl trichlorosilane, diallyl methylgluconate, diallyl tartronate, diallyl tartrate, diallyl mesaconate, the diallyl ester of muconic acid, diallyl chlorophthalate, diallyl dichlorosilane, the diallyl ester of endomethylene tetrahydrophthalic anhydride, triallyl tricarballylate, trialyl cyanurate, triallyl citrate, triallyl phosphate, tetrallyl silane, tetrallyl silicate, hexallyl disiloxane, etc. Other examples of allyl compounds that may be employed are given, for example, in U.S. Patent No. 2,510,503, issued June 6, 1950.

Among the comonomers which are preferred for use in carrying our invention into effect are, for example, compounds such as acrylonitrile, and other compounds containing a $CH_2=C<$ grouping, e.g., the various substituted acrylonitriles (e.g., methacrylonitrile, ethacrylonitrile, phenylacrylonitrile, etc.), the acrylates and methacrylates such as ethyl acrylate, methyl methacrylate etc., the various N-substituted acrylamides and alkacrylamides, for instance, N-dialkyl acrylamides and methacrylamides, e.g., N-dimethyl, -diethyl, -dipropyl, -dibutyl, etc., acrylamides and methacrylamides, also 2-diallylamino-2,4-disubstituted s-triazines having the formula

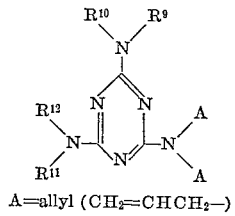

A=allyl ($CH_2=CHCH_2-$)

wherein $R^9$ to $R^{12}$ are alkyl radicals having from 1 to 10 carbon atoms, inclusive, aryl radicals of 6 to 10 carbon atoms, alkene radicals of two to four carbon atoms, aralkyl radicals, alkaryl radicals or cycloalkyl radicals and each of the pairs of radicals $R^9$ and $R^{10}$, $R^{11}$ and $R^{12}$ together with the nitrogen atom may represent a 6 to 9 membered alkylenimino radical, such as for example 2,4-bis(dipropylamino)-6-diallylamino s-triazine, 2,4-bis(diphenylamino)-6-diallylamino s-triazine, 2-dipropylamino-4-diphenylamino-6-diallylamino s-triazine, 2-phenyloctyl-amino-4-xylylmethylamino-6-diallylamino s-triazine, 2-dimethylamino-4-diallylamino-6-piperidino s-triazine, and the like. Other monomers copolymerizable with the monomers of Formula I, above, are given, for instance, in U.S. Patent No. 2,601,572, dated June 24, 1952, where examples are given both by classes and species.

It is also stressed that the allyl compounds of the present invention can also be copolymerized with one another, as well as the monomers mentioned above, so as to form useful copolymers for industrial use, utilizing for the copolymerization process, the same catalysts and conditions set forth hereinabove for use in the homopolymerization processes.

When preparing the copolymers it is generally acceptable to use a weight ratio of from about 10% to about 90% of the allyl compounds of Formula I to from about 90% to about 10% of the unsaturated monomers copolymerizable therewith, however, it is preferred to use a weight ratio of more than at least about 60% of the compounds of Formula I to about less than 40% of the monomers copolymerizable therewith. When copolymerizing the compounds of Formula I, above, with each other, any amount of either monomer may be used, depending upon the type of copolymer desired.

FIGURES I and II, discussed more fully hereinbelow, demonstrate the low dissipation factor up to at least 200° C. and the ability of the material to maintain the dielectric assets even when subjected to the severe treatment of oxidative degradation at 200° C. and repeated thermal shock.

FIGURE I represents a graph of the variation of the dissipation factor and dielectric constant of glass reinforced poly[2,4-bis(diallylamino)-6-piperidino s-triazine] at 60 c.p.s. as influenced by cycling between room temperature and 200° C. in air. Besides stressing the excellently low values at both lower and upper temperatures, it further demonstrates that these values are virtually unaffected by the thermal shock which accompanies the cycling. The results of measurements of the dielectric constant parallel those of dissipation factor.

FIGURE II represents a graph of the variation of the dissipation factor (at 60 c.p.s. and at 10⁶ c.p.s.) of a glass-cloth reinforced laminate of poly[2,4-bis(diallylamino)-6-piperidino s-triazine] as a function of both temperature, up to 100° C. and time at 200° C. It demonstrates that at normal temperatures the reinforced resin has extremely low electrical losses and that even at 200° C. the losses are lower than those of most thermoset resins at room temperature. Further, exposure at 200° C. in air for a prolonged period (1000 hours) does not affect the dissipation factor.

The magnitude of the dissipation factor at room temperature of the laminated resin is virtually unaltered after such a severe treatment.

The following examples are by way of illustration only and are by no means meant to be construed as limitations on the instant invention. All parts and percentages are by weight unless otherwise indicated.

EXAMPLE 1

Preparation of hexallyl melamine

Scheme:

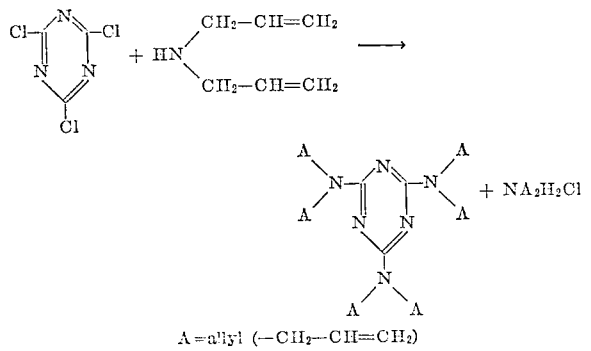

A = allyl (—CH₂—CH=CH₂)

One part of cyanuric chloride is dissolved in 4 parts of xylene and this solution is added to a suitable reaction vessel. 3.5 parts of diallylamine are then added slowly, while the solution is being agitated. An exotherm occurs during the addition of the first 1.2 parts of diallylamine. By slow addition of the amine over a period of one hour, and by use of an ice bath, the temperature is maintained below 50° C. The remaining amine is then added more rapidly with no apparent exotherm. The temperature is raised slowly and the mixture is heated to reflux at 140° C. for about three hours. The reaction mixture is then cooled to room temperature and the precipitated amine salt is removed therefrom by filtration through glass wool. The mixture is then distilled under 15 mm. Hg pressure at 50° C. to remove the xylene and excess amine. A yellow liquid is left and this liquid is passed through acidic aluminum oxide to remove the color. The resulting liquid is fractionally distilled under 0.1 mm. Hg pressure and hexallyl melamine distills over at 140° C.

The properties of the hexallyl melamine are as follows:

Molecular formula _____ $N_6C_{21}H_{30}$
Molecular weight _____ 366

Structure:

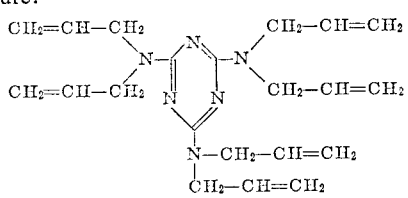

Boiling point _____ 140° C. at 0.1 mm. Hg.
Appearance _____ Colorless, viscous liquid.
Refractive index ____ $N_d^{25}$, 1.5390.
Solubility _____ Completely soluble in acetone, ethanol, benzene, n-hexane, apparently insoluble in $H_2O$.

EVIDENCE FOR STRUCTURE

Purity indicated by vapor phase chromatography.—One absorption peak with a relative retention time versus dibutyl sebacate different from that of monochlorobis(diallylamino)-s-triazine (a soluble intermediate and possible impurity).

*Analysis.*—Found: C, 68.79; H, 8.31; N, 22.95. Theory: C, 68.85; H, 8.20; N, 22.95.

Also, infrared spectroscopy, nuclear magnetic resonance spectroscopy and ultraviolet spectroscopy support the structure.

EXAMPLE 2

Preparation of 2,4-bis(diallylamino)-6-piperidino-s-triazine

Into a suitable reaction vessel equipped with a sight glass, gas inlet and outlets, an agitator, and a temperature recording device, are charged 350 parts of toluene. One-hundred parts of solid cyanuric chloride are slurried with toluene and 109.5 parts of diallylamine are slowly added holding the temperature constant at 25° C. The contents of the reaction vessel are then heated to 40° C. and 86 parts of a 50% sodium hydroxide solution (43 parts of water) are slowly added and the temperature is allowed to rise to a maximum of 60° C. The reaction is held at this temperature for one hour and then 50 parts of water are added with agitation for 5 to 10 minutes. The reaction medium is allowed to settle for about 15 minutes and the lower aqueous phase is then drawn off. The reaction medium is then heated to 75° C. and 50 parts of piperidine are slowly added. The temperature is allowed to rise to the reflux temperature and agitation is commenced for 15 minutes. Forty-three parts of a 50% sodium hydroxide solution (21 parts of water) are then slowly added while the temperature is held at, or just below, reflux. The reaction is then held at 90° C. for 4 hours and 30 parts of water are then added with agitation. The reaction vessel contents are allowed to settle for 15 minutes and the lower aqueous phase is then withdrawn. One-hundred parts of water are then added and the reaction vessel is held at about 50° C. for five minutes with stirring. The phases are again allowed to separate, the aqueous phase is drained off, and the wash is repeated with 96 parts of water to which 15 parts of 37% HCl have been added. A final wash is conducted with 100 parts of water with slight agitation, settling and withdrawal of the aqueous phase. The toluene is then stripped off using a pressure of 20–30 mm. and nitrogen is then allowed to enter the vessel at the end of the distillation. 182 parts of 2,4-bis(diallylamino)-6-piperidino-s-triazine are recovered, representing a yield of 94%.

EXAMPLE 3

Homopolymerization of hexallyl melamine

One-hundred parts of hexallyl melamine and 2.5 parts of di-tert. butyl peroxide are mixed together by a stream of dry nitrogen in a suitable reaction vessel. The reaction vessel is connected to an oil-vacuum pump and the vessel is evacuated while at a temperature of −68° C. The pump is disconnected and the contents of the reaction vessel are allowed to warm to room temperature. The reaction vessel is then cooled again to −68° C. and a vacuum is applied. The step of degassing the vessel by alternate cooling and warming is repeated six times. The vessel is then sealed immediately after cooling to −68° C. and is heated at 130° C. in an oil bath for 24 hours.

Upon examination of the contents of the vessel there is found a hard, transparent, uncrazed, solid homopolymer. The solid is resinous. Upon immersion of the solid in benzene at 70° C. for 24 hours no detectable change was observed.

Castings were formed from the hexallyl melamine homopolymer and said castings were subjected to temperature. The results are shown in the following table.

TABLE I

| Type of Casting | Time of Heating (min.) | Weight Loss, Percent |
|---|---|---|
| Pellet | 160 (in air) at 370° C | 3 |
| Powder | 45 (in N₂) at 370° C | 3 |

This table shows that castings produced from the polymers of the instant invention have high thermal stability.

EXAMPLE 4

Forty parts of hexallyl melamine and 0.4 part of di-tert. butyl peroxide are heated at 130° C. for 85 hours between cellophane-covered glass. Upon testing the clear, uncrazed, hard casting which results, the following results are obtained.

Heat distortion temperature ____ >230° C.
Rockwell hardness 'M' scale ____ 120
Barcol hardness ____ 46

EXAMPLE 5

The procedure of Example 3 is again followed except that 1 part of 2,5-dimethyl-2,5-di(tert. butylperoxy)-n-hexane is used as the catalyst. Again a clear, uncrazed, yellow, resinous polymer is formed.

EXAMPLE 6

The procedure of Example 3 is followed again except that 100 parts of 2,4-bis(diallylamino)-6-dipropylamino-s-triazine are used as the starting material. A colorless, clear, uncrazed polymer is recovered.

EXAMPLE 7

Following the procedure of Example 3, 100 parts of 2,4-bis(diallylamino)-6-piperidino-s-triazine are heated with 2 parts of di-tert. butyl peroxide. A colorless, uncrazed, solid resin results.

EXAMPLE 8

The procedure of Example 3 is again followed except that 2,2-bis(t-butylperoxy)butane is employed, in equal amounts, as the catalyst. A clear, hard polymer is produced.

EXAMPLE 9

The procedure of Example 3 is followed except that 100 parts of 2,4-bis(diallylamino)-6-diphenylamino-s-triazine are substituted for the triazine therein. A colorless, uncrazed solid resin is recovered. It has a dissipation factor of 0.0016 at 60 c.p.s./25° C.

EXAMPLE 10

Again utilizing the procedure of Example 3, 100 parts of 2,4-bis(diallylamino)-6-di-p-tolylamino s-triazine are substituted for the hexallyl melamine therein. A colorless, uncrazed, solid resin is recovered.

EXAMPLE 11

Again utilizing the procedure of Example 3, 100 parts of 2,4-bis(diallylamino)-6-dibenzylamino s-triazine are substituted for the hexallyl melamine therein. A colorless, uncrazed, solid resin is recovered.

EXAMPLE 12

Again utilizing the procedure of Example 3, 100 parts of 2,4-bis(diallylamino)-6-dicyclohexylamino s-triazine are substituted for the hexallyl melamine therein. A colorless, uncrazed, solid resin is recovered.

Various polymerization reactions were carried out utilizing the general procedure of Example 3, i.e., in a nitrogen atmosphere, with various known vinyl polymerization catalysts and methods. The comparative results between those of the prior art and those of our process are set out in Table II, below.

TABLE II.—HOMOPOLYMERIZATION OF HEXALLYL MELAMINE

| Initiator | Percent | Temp., °C. | Hours | Description of Product |
|---|---|---|---|---|
| Benzoyl peroxide | 0.1 | 72 | 24 | No apparent viscosity change. |
|  | 10.0 | 72 | 24 | Slight viscosity increase, liquid. |
| Di-tertiarybutyl peroxide | 1.0 | 130 | 24 | Hard uncrazed solid. |
|  | 2.5 | 130 | 24 | Very hard uncrazed solid unattacked by benzene (70° C.) in 24 hours. |
|  | 5.0 | 130 | 24 | Do. |
|  | 10.0 | 130 | 24 | Do. |
| Azobisisobutyronitrile | 1.0 | 76 | 24 | No apparent viscosity change. |
|  | 10.0 | 76 | 24 | Foamed solid. |
| Cumene hydroperoxide | 1.0 | 160 | 24 | No apparent viscosity change. |
|  | 10.0 | 160 | 24 | Slight viscosity increase. |
| 2,2-bis(t-butylperoxy)butane | 1.0 | 130 | 24 | Solid rubber. |
| 2,5-dimethyl-2,5-di(t-butylperoxy)butane | 1.0 | 130 | 24 | Hard, uncrazed solid. |
| Tertiary butyl perbenzoate | 1.0 | 130 | 24 | Slightly viscous liquid. |
| Tertiary butyl peracetate | 1.0 | 130 | 24 | Do. |
| Di-tertiary butyl di-perphthalate | 1.0 | 130 | 24 | No apparent change. |
| Tertiary butyl hydroperoxide | 1.0 | 130 | 24 | Liquid gel-like material. |
| Electron irradiation Dose: |  |  |  |  |
| 18 Megrads 0° C | | | | No apparent viscosity change. |
| 18 Megrads −78° C | | | | Do. |
| X-ray irradiation, Dose 10 Megrads 130° C | | | | Do. |

EXAMPLE 13

One-hundred parts of hexallyl melamine are added to 2 parts of ditertiary butyl peroxide in a suitable reaction vessel in open atmosphere at 130° C. for 24 hours. A friable, granulated, solid material is produced.

EXAMPLE 14

Procedure of Example 13 is again followed with 2,5-dimethyl - 2,5 - di(tertiarybutylperoxy)-n-hexane as the catalyst. Again a friable, granulated solid material was produced. Examples 13 and 14 therefore show the detrimental effect of oxygen on the products produced by the novel process of the present invention and point out the criticality of conducting the polymerization in the absence thereof.

EXAMPLE 15

One-hundred parts of hexallyl melamine, degassed in vacuo, and 2 parts of 2,5-dimethyl-2,5-di-tertiary butyl-peroxy-n-hexane are mixed together under nitrogen. A glass cloth is placed on a sheet of a cellulosic film and the melamine mixture is then allowed to soak into said cloth. Another glass cloth is placed upon the first cloth and more melamine mixture is then added. This procedure is then followed until twelve layers of cloth have been added. The whole structure is wrapped in cellulosic film and placed between polished stainless steel plates. A pressure of 10 p.s.i. is then applied to the structure in a press at 130° C. for 72 hours. A glass-reinforced laminate is recovered after slowly cooling to room temperature in the press.

EXAMPLE 16

The same laminating procedure of Example 15 is again employed except that 2,4-bis(diallylamino)-6-piperidino-s-triazine is substituted for the hexallyl melamine. A glass reinforced laminate is recovered.

EXAMPLE 17

Utilizing the procedure of Example 15, 2,4-bis(diallyl-amino)-6-diphenylamino-s-triazine is substituted for the hexallyl melamine. A glass-reinforced laminate is recovered.

EXAMPLE 18

Again utilizing the procedure of Example 15, 2,4-bis-(diallylamino)-6-di-p-tolylamino-s-triazine is substituted for the hexallyl melamine and 2,2-bis(t-butylperoxy)butane is employed as the catalyst. A glass-reinforced laminate is recovered.

EXAMPLE 19

The procedure of Example 15 is again utilized except that 2,4 - bis(diallylamino)-6-dibenzylamino-s-triazine is substituted for the hexallyl melamine. A glass reinforced laminate is recovered.

EXAMPLE 20

Again utilizing the procedure of Example 15, 2,4-bis-(diallylamino)-6-dicyclohexylamino-s-triazine is substituted for the hexallyl melamine and di-tertiary butyl peroxide is employed as the catalyst. A glass-reinforced laminate is recovered.

The following examples are presented to show the polymerizations of the compounds of the present invention with other unsaturated monomers.

EXAMPLE 21

Copolymerization of hexallyl melamine

One part of hexallyl melamine, 1 part of triallyl cyanurate and .01 part of di-tert. butyl peroxide are added to a suitable reaction vessel. The mixture forms a single phase. The vessel is flushed with nitrogen, loosely sealed and heated to 155° C. for ½ hour. Upon opening the vessel a hard, uncrazed, transparent, solid copolymer is recovered.

EXAMPLE 22

Three parts of hexallyl melamine, 7 parts of 2,4-bis-(diallylamino)-6-piperidino-s-triazine, 5 parts of 2,4-bis-(dipropylamino)-6-diallylamino-s-triazine and 0.3 part of 2,5-dimethyl-2,5-di-tert. butylperoxy-n-hexane are added to a reaction vessel. A single phase forms. A copolymeric resin of the three monomers is recovered after heating at 130° C. for 72 hours.

EXAMPLE 23

Utilizing a monomeric mixture of hexallyl melamine, 2,4-bis(diallylamino)-6-piperidino-s-triazine and 2,4-bis-(dipropylamino) - 6 - diallylamine - s-triazine (30/70/50 parts, respectively) having an average of 3.60 allyl groups per s-triazine ring, a laminate is produced following the procedure of Example 15.

EXAMPLE 24

Utilizing a monomeric mixture of hexallyl melamine, 2,4-bis(diallylamino)-6-piperidino-s-triazine and 2,4-bis-(dipropylamino) - 6 - diallylamino-s-triazine (30/70/100 parts respectively) having an average of 3.30 allyl groups per s-triazine ring, a laminate is produced following the procedure of Example 15.

EXAMPLE 25

Utilizing a monomeric mixture of hexallyl melamine, 2,4-bis(diallylamino)-6-piperidino-s-triazine and 2,4-bis-(dipropylamino) - 6 - diallylamino-s-triazine (30/70/33.3 parts, respectively) having an average of 3.95 allyl groups per s-triazine ring, a laminate is produced following the procedure of Example 15.

EXAMPLE 26

Utilizing a monomeric mixture of hexallyl melamine and 2,4-bis(diallylamino)-6-piperidino-s-triazine (30/70 parts respectively) having an average of 4.60 allyl groups per s-triazine ring, a laminate is again produced following the procedure of Example 15.

EXAMPLE 27

Utilizing a monomeric mixture of hexallyl melamine and 2,4-bis(diallylamino)-6-piperidino-s-triazine (75/25 parts respectively) having an average of 5.50 allyl groups per s-triazine ring, a laminate is again produced following the procedure of Example 15.

The thermal softening properties of glass-reinforced laminates produced as set forth in Examples 15, 16 and 23–27 are set forth in Table III, below.

TABLE III

| Laminate Produced as in Example | 15 | 16 | 23 | 24 | 25 | 26 | 27 |
|---|---|---|---|---|---|---|---|
| Average Functionality of Monomer Mixture | 4.00 | 6.00 | 3.60 | 3.30 | 3.95 | 4.60 | 5.50 |
| Flexural Strength, p.s.i.: | | | | | | | |
| 23° C | 67,200 | 36,300 | 56,500 | 61,700 | 48,700 | 58,800 | 37,000 |
| ½ hr. 260° C | 49,200 | 34,000 | 35,300 | 29,300 | 37,800 | 44,100 | 38,800 |
| Young's Modulus×$10^{-6}$, p.s.i.: | | | | | | | |
| 23° C | 3.50 | 3.1 | 3.2 | 3.6 | 3.3 | 3.2 | 2.9 |
| ½ hr. 260° C | 2.94 | 2.8 | 2.8 | 2.6 | 2.9 | 3.0 | 3.2 |

The thermal stability and thermal softening properties of various glass reinforced commercially available thermoset resins are set forth hereinbelow in Table IV in comparison to the products of Examples 15 and 16 utilizing the compounds of the present invention.

2,5-di-t-butylperoxy n-hexane in a suitable degassed and sealed vessel for a period of 64 hours. The resulting polymer is crushed and heated isothermally at 405° C. in nitrogen. After 100 minutes the sample loses 12% of its initial weight.

TABLE IV

| A [5] | Conditions | Tested at °C | Laminate (glass-reinforced) | | | | | | |
|---|---|---|---|---|---|---|---|---|---|
| | | | Epoxy [1] | Phenolic [1] | Silicone [1] | Heat Resistant Polyester [1] | Melamine | Product of Ex. 15 | Product of Ex. 16 |
| F.S.[3], p.s.i. (F.M.[4]×10⁻⁶) | Air | 23° C | 23 | 54,000 (3.12) | 40,000 (2.63) | 37,900 (2.32) | 57,000 (3.1) | 55,000 | 36,000 (3.1) | 67,200 (3.5) |
| F.S.[3], p.s.i. (F.M.[4]×10⁻⁶) | Air | 260° C./½ hr | 260 | 5,700 (2.20) | 30,600 (2.20) | 10,700 (1.14) | 31,600 (2.8) | ---------- | 34,000 (2.8) | 49,200 (2.94) |
| F.S.[3], p.s.i. (F.M.[4]×10⁻⁶) | Air | 260° C./192 hr | 260 | (6) | 10,300 (1.60) | 17,400 (1.80) | 16,500 (2.40) | (6) | ---------- | 23,100 (1.42) |
| F.S.[3], p.s.i. (F.M.[4]×10⁻⁶) | N² | 345° C./192 hr | 260 | (6) | 16,500 (1.96) | 9,900 (1.47) | 12,300 (2.6) | (6) | 28,300 (2.5) | 30,900 (2.45) |
| Percent Weight Loss | N² | 345° C./192 hr | 23 | (6) | 11.8 | 1.3 | 25.1 | (6) | 3.6 | 1.60 |
| TGA (T₁₀, °C)² | N² | | | 385 | 390 | 340 | 320 | <320 | 475 | 470 |

[1] Commercially available resin.
[2] Thermal Gravimetric Analysis.
[3] Flexural Strength.
[4] Flexural Modulus.
[5] Atmosphere.
[6] Delaminated.

$T_{10}$ = temperature at which 10% weight loss has occurred during process of raising temperature 10° C./min.

A comparison of relevant electrical properties is set out hereinbelow in Table V between polymers of the present invention and commercially available polymers.

TABLE V

| | Epoxy [1] | Phenolic [1] | Polyester [1] | Melamine [1] | Diallyl Phthalate | Resin of Ex. 7 | Silicone [1] |
|---|---|---|---|---|---|---|---|
| Unfilled Resins: | | | | | | | |
| Dissipation factor 60/c.p.s. | 0.002–0.010 | 0.06–0.15 | 0.003–0.028 | | 0.006–0.019 | 0.002 | |
| Arc Resistance/sec. | 45–120 | Tracks | 125 | 100–145 | 120–250 | 128 | |
| Glass Filled Resins: | | | | | | | |
| Dissipation factor/60 c.p.s. | 0.008–0.03 | 0.05 | 0.01–0.04 | | 0.01 | 0.0001 | 0.004–0.03 |
| Arc Resistance/sec. | 150–300 | 4–150 | 60–120 | 180 | 105–125 | 186.2 | 150–250 |

[1] Commercially Available Resins.

EXAMPLE 28

Again following the procedure of Example 3, except that 100 parts of 2,4-bis(diallylamino)-6-allylmethylamino-s-triazine are used as charge material, a solid, uncrazed, colorless resin is recovered.

EXAMPLE 29

Again following the procedure of Example 15, except that 2,4-bis(diallylamino)-6-allylphenylamino-s-triazine is used in place of the hexaallyl melamine, a glass reinforced aminate is recovered.

EXAMPLE 30

Utilizing a monomeric mixture of hexaallyl melamine and 2,4-bis(diallylamino)-6-allylbenzylamino-s-triazine (50/50 parts, respectively) having an average of 5.5 allyl groups per s-triazine ring, a laminate is again produced utilizing the procedure of Exabple 15.

EXAMPLE 31

One-hundred parts of hexaallyl melamine are heated with 2.0 parts of 2,5-dimethyl-2,5-di-t-butylperoxy n-hexane in a suitable degassed and sealed vessel for a period of 64 hours. The resulting polymer is crushed and heated isothermally at 405° C. in nitrogen. After 100 minutes the sample loses 17% of its initial weight.

EXAMPLE 32

One-hundred parts of 2,4-bis(diallylamino)-6-di-n-propylamino-s-triazine are heated with 2.0 parts of 2,5-di-t-butylperoxy n-hexane in a suitable degassed and sealed vessel for a period of 64 hours. The resulting polymer is crushed and heated isothermally at 405° C. in nitrogen. After 100 minutes the sample loses 13% of its initial weight.

EXAMPLE 33

One-hundred parts of 2,4-bis(diallylamino)-6-piperidino-s-triazine are heated with 2.0 parts of 2,5-dimethyl-2,5-di-t-butylperoxy n-hexane in a suitable degassed and sealed vessel for a period of 64 hours. The resulting polymer is crushed and heated isothermally at 405° C. in nitrogen. After 100 minutes the sample loses 12% of its initial weight.

EXAMPLE 34

(Comparative)

One-hundred parts of 2,4,6-tris(allyl-n-propylamino)-s-triazine are heated with 2.0 parts of 2,5-dimethyl-2,5-di-t-butylperoxy n-hexane in a suitable degassed and sealed vessel for a period of 64 hours. The resulting polymer is crushed and heated isothermally at 405° C. in nitrogen. After 100 minutes the sample loses 45% of its initial weight.

EXAMPLE 35

One-hundred parts of hexaallyl melamine are heated with 2.0 parts of 2,5-dimethyl-2,5-di-1-butylperoxy n-hexane in a suitable degassed and sealed vessel for a period of 64 hours. The resulting polymer is crushed and heated isothermally at 370° C. in air. After 100 minutes the sample loses 19% of its initial weight.

EXAMPLE 36

One-hundred parts of 2,4-bis(diallylamino)-6-di-n-propylamino-s-triazine are heated with 2.0 parts of 2,5-dimethyl-2,5-di-t-butylperoxy n-hexane in a suitable degassed and sealed vessel for a period of 64 hours. The resulting polymer is crushed and heated isothermally at 370° C. in air. After 100 minutes the sample loses 17% of its initial weight.

EXAMPLE 37

One-hundred parts of 2,4-bis(diallylamino)-6-piperidino-s-triazine are heated with 2.0 parts of 2,5-dimethyl-2,5-di-t-butylperoxy n-hexane in a suitable degassed and sealed vessel for a period of 64 hours. The resulting polymer is crushed and heated isothermally at 370° C. in air. After 100 minutes the sample loses 21% of its intial weight.

EXAMPLE 38

(Comparative)

One-hundred parts of 2,4,6-tris(allyl-n-propylamino)-s-triazine are heated with 2.0 parts of 2,5-dimethyl-2,5-di-t-butylperoxy n-hexane in a suitable degassed and sealed vessel for a period of 64 hours. The resulting polymer is crushed and heated isothermally at 370° C. in air. After 100 minutes the sample loses 40% of its initial weight.

Dyes, pigments, driers, curing agents, plasticizers, mold lubricants, opacifiers and various fillers (e.g., wood, flour, glass fibers, asbestos, mineral wool, mica dust, powdered quartz, titanium dioxide, talc, China clay, carbon black, etc.) may be compounded, by conventional practice, with our resinous materials.

We claim:
1. A method for polymerizing a compound having the formula

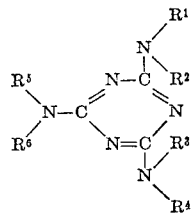

wherein $R^1$, $R^2$, $R^3$, $R^4$, $R^5$ and $R^6$ are selected from the group consisting of an alkyl radical having from 1 to 10 carbon atoms, inclusive, an aryl radical having from 6 to 10 carbon atoms, inclusive, an alkene radical having from 2 to 4 carbon atoms, inclusive, an aralkyl radical, an alkaryl radical and a cycloalkyl radical and not more than one of the pairs of radicals $R^1$ and $R^2$, $R^3$ and $R^4$, $R^5$ and $R^6$ together with the non-ring nitrogen atom represent a 6–9 membered alkylenimino radical and wherein at least four of the $R^1$ to $R^6$ groups are allyl radicals which comprises heating said compound, alone or in admixture with a different polyallyl compound, to a temperature of between 70° C. and 350° C. in the presence of from about 0.1% to about 10.0%, by weight, of a catalyst having the formula

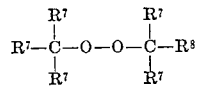

wherein $R^7$ is an alkyl radical having 1 to 4 carbon atoms, inclusive, and $R^8$ is selected from the group consisting of an alkyl radical having 1 to 4 carbon atoms, inclusive, an

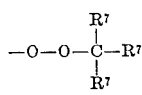

radical and an

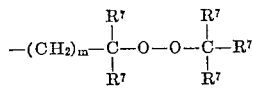

radical wherein $m$ is a whole positive integer of from 1 to 4, inclusive, $R^7$ is as defined above, and in an inert atmosphere.

2. A method for polymerizing a compound having the formula

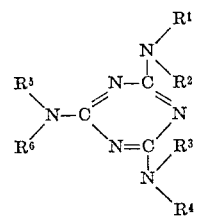

wherein $R^1$, $R^2$, $R^3$, $R^4$, $R^5$ and $R^6$ are selected from the group consisting of an alkyl radical having from 1 to 10 carbon atoms, inclusive, an aryl radical having from 6 to 10 carbon atoms, inclusive, an alkene radical having from 2 to 4 carbon atoms, inclusive, an aralkyl radical, an alkaryl radical and a cycloalkyl radical and not more than one of the pairs of radicals $R^1$ and $R^2$, $R^3$ and $R^4$, $R^5$ and $R^6$ together with the non-ring nitrogen atom represent a 6 to 9 membered alkylenimino radical and wherein at least four of the $R^1$ and $R^6$ groups are allyl radicals which comprises heating said compound, alone or in admixture with a different polyallyl compound, to a temperature of between 70° C. and 350° C. in the presence of from about 0.1% to about 10.0%, by weight, of di-tertiarybutyl peroxide and in an inert atmosphere.

3. A method for polymerizing a compound having the formula

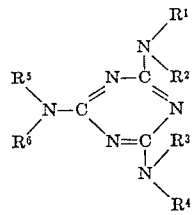

wherein $R^1$, $R^2$, $R^3$, $R^4$, $R^5$ and $R^6$ are selected from the group consisting of an alkyl radical having from 1 to 10 carbon atoms, inclusive, an aryl radical having from 6 to 10 carbon atoms, inclusive, an alkene radical having from 2 to 4 carbon atoms, inclusive, an aralkyl radical, an alkaryl radical and a cycloalkyl radical and not more than one of the pairs of radicals $R^1$ and $R^2$, $R^3$ and $R^4$, $R^5$ and $R^6$ together with the non-ring nitrogen atom represent a 6 to 9 membered alkylenimino radical and wherein at least four of the $R^1$ and $R^6$ groups are allyl radicals which comprises heating said compound, alone or in admixture with a different polyallyl compound, to a temperature of between 70° C. and 350° C. in the presence of from about 0.1% to about 10.0%, by weight of 2,2-bis(tertiarybutylperoxy) n-butane and in an inert atmosphere.

4. A method for polymerizing a compound having the formula

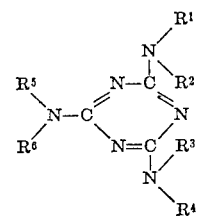

wherein $R^1$, $R^2$, $R^3$, $R^4$, $R^5$ and $R^6$ are selected from the group consisting of an alkyl radical having from 1 to 10 carbon atoms, inclusive, an aryl radical having from 6 to 10 carbon atoms, inclusive, an alkene radical having from 2 to 4 carbon atoms, inclusive, an aralkyl radical, an alkaryl radical and a cycloalkyl radical and not more than one of the pairs of radicals $R^1$ and $R^2$, $R^3$ and $R^4$, $R^5$ and $R^6$ together with the non-ring nitrogen atom represent a 6 to 9 membered alkylenimino radical and wherein at least four of the $R^1$ to $R^6$ groups are allyl radicals which comprises heating said compound, alone or in admixture with a different polyallyl compound, to a temperature of between 70° C. and 350° C. in the presence of from about 0.1% to about 10.0%, by weight, of 2,5-dimethyl-2,5-di (tertiarybutylperoxy)n-hexane and in an inert atmosphere.

5. A method according to claim 1 wherein the compound is hexallyl melamine.

6. A method according to claim 1 wherein the compound is 2,4-bis(diallylamino)-6-piperidino-s-triazine.

7. A method according to claim 1 wherein the compound is 2,4-bis(diallylamino)-6-diphenylamino-s-triazine.

8. A solid polymer of from about 10% to about 100% of a compound having the formula

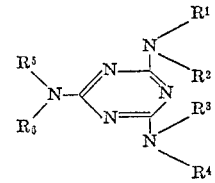

wherein $R^1$, $R^2$, $R^3$, $R^4$, $R^5$, and $R^6$ are selected from the group consisting of an alkyl radical having 1 to 10 carbon atoms, inclusive, an aryl radical having from 6 to 10 carbon atoms, inclusive, an alkene radical having 2 to 4 carbon atoms, inclusive, an aralkyl radical, an alkaryl radical and a cycloalkyl radical and wherein not more than one of the pairs of radicals $R^1$ and $R^2$, $R^3$ and $R^4$, and $R^5$ and $R^6$, together with the nitrogen atom, represent a 6 to 9 membered alkylenimino radical and wherein at least four of the $R^1$ to $R^6$ groups are allyl radicals, and from about 0% to about 90% of a different polyallyl compound, said polymer being characterized by a low dissipation factor, a high arc resistance, and excellent thermal stabiilty and thermal softening behavior.

9. A solid polymer of from about 10% to about 100% of hexallyl melamine and from about 0% to about 90% of a different polyallyl compound, said polymer being characterized by a low dissipation factor, a high arc resistance, excellent thermal stability and thermal softening behavior.

10. A solid polymer of from about 10% to about 100% of 2,4-bis(diallylamino)-6-piperidino-s-triazine and from about 0% to about 90% of a different polyallyl compound, said polymer being characterized by a low dissipation factor, a high arc resistance, excellent thermal stability and thermal softening behavior.

11. A solid polymer of from about 10% to about 100% of 2,4-bis(diallylamino)-6-dimethylamino-s-triazine and from about 0% to about 90% of a different polyallyl compound, said polymer being characterized by a low dissipation factor, a high arc resistance, excellent thermal stability and thermal softening behavior.

12. A solid polymer of from about 10% to about 100% of 2,4-bis(diallylamino) - 6 - diphenylamino-s-triazine and from about 0% to about 90% of a different polyallyl compound, said polymer being characterized by a low dissipation factor, a high arc resistance, excellent thermal stability and thermal softening behavior.

13. A thermoset laminate having as its resin content a polymer of from about 10% to about 100% of a compound having the formula

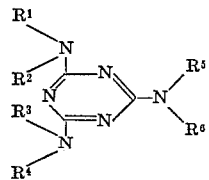

wherein $R^1$, $R^2$, $R^3$, $R^4$, $R^5$, and $R^6$ are selected from the group consisting of an alkyl radical having 1 to 4 carbon atoms, inclusive, an aryl radical having from 6 to 10 carbon atoms, inclusive, an alkene radical having two to four carbon atoms, inclusive, an aralkyl radical, and alkaryl radical and a cycloalkyl radical and wherein not more than one of the pairs of radicals $R^1$ and $R^2$, $R^3$ and $R^4$, $R^5$ and $R^6$, together with the nitrogen atom, represent a 6 to 9 membered alkylenimino radical and wherein at least four of the $R^1$ to $R^6$ groups are allyl radicals, and from about 0% to about 90% of a different polyallyl compound said laminate having a low dissipation factor, a high arc resistance, excellent thermal stability and thermal softening behavior.

14. A thermoset laminate having as its resin content a polymer of from about 10% to about 100% of hexallyl melamine, and from about 0% to about 90% of a different polyallyl compound said laminate having a low dissipation factor, a high arc resistance, excellent thermal stability and thermal softening behavior.

15. A thermoset laminate having as its resin content a polymer of from about 10% to about 100% of 2,4-bis-(diallylamino)-6-piperidino-s-triazine, and from about 0% to about 90% of a different polyallyl compound said laminate having a low dissipation factor, a high arc resistance, excellent thermal stability and thermal softening behavior.

16. A thermoset laminate having as its resin content a polymer of from about 10% to about 100% of 2,4-bis(diallylamino)-6-dimethylamino-s-triazine, and from about 0% to about 90% of a different polyallyl compound said laminate having a low dissipation factor, a high arc resistance, excellent thermal stability and thermal softening behavior.

17. A thermoset laminate having as its resin content a polymer of from about 10% to about 100% of 2,4-bis(diallylamino)-6-di-n-butylamino-s-triazine, and from about 0% to about 90% of a different polyallyl compound said laminate having a low dissipation factor, a high arc resistance, excellent thermal softening stability and thermal softening behavior.

18. A thermoset laminate having as its resin content a polymer of from about 10% to about 100% of 2,4-bis(diallylamino)-6-diphenylamino-s-triazine, and from about 0% to about 90% of a different polyallyl compound said laminate having a low dissipation factor, a high arc resistance, excellent thermal stability and thermal softening behavior.

References Cited
UNITED STATES PATENTS

| | | | |
|---|---|---|---|
| 2,712,004 | 6/1955 | Thomas | 260—89.7 |
| 2,829,119 | 4/1958 | Dudley et al. | 260—67.6 |
| 2,861,901 | 11/1958 | Reeves et al. | 260—89.7 |
| 3,277,065 | 10/1966 | Petropoulos et al. | 260—89.7 |

JOSEPH L. SCHOFER, *Primary Examiner.*

H. WONG, *Assistant Examiner.*